US010219286B2

United States Patent
Cariou et al.

(10) Patent No.: US 10,219,286 B2
(45) Date of Patent: Feb. 26, 2019

(54) STATION (STA) AND METHOD FOR COMMUNICATION ON PRIMARY AND SECONDARY CHANNEL RESOURCES

(71) Applicant: Intel IP Corporation, Santa Clara, CA (US)

(72) Inventors: Laurent Cariou, Portland, OR (US); Chittabrata Ghosh, Fremont, CA (US); Carlos Cordeiro, Portland, OR (US); Assaf Kasher, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/889,561

(22) Filed: Feb. 6, 2018

(65) Prior Publication Data
US 2018/0220435 A1     Aug. 2, 2018

Related U.S. Application Data

(63) Continuation of application No. 14/813,581, filed on Jul. 30, 2015, now Pat. No. 9,918,329.

(51) Int. Cl.
*H04W 72/12* (2009.01)

(52) U.S. Cl.
CPC .................................. *H04W 72/12* (2013.01)

(58) Field of Classification Search
CPC ..................................................... H04W 72/12
See application file for complete search history.

(56) References Cited

U.S. PATENT DOCUMENTS

| 9,918,329 | B2 | 3/2018 | Cariou et al. | |
| 2008/0253327 | A1 | 10/2008 | Kohvakka et al. | |
| 2015/0049694 | A1* | 2/2015 | Choi ................ | H04L 5/0032 370/329 |
| 2015/0195824 | A1 | 7/2015 | Choi et al. | |
| 2016/0088555 | A1 | 3/2016 | Trainin et al. | |

(Continued)

OTHER PUBLICATIONS

IEEE, Wireless LAN medium access control (MAC) and physical layer (PHY) specifications, Mar. 15, 2014, Amendment 3,Sections 8.3.1.13, 8.3.1.19, 9.33.7, 9.33.9.*

(Continued)

*Primary Examiner* — Ricky Q Ngo
*Assistant Examiner* — Stephen N Steiner
(74) *Attorney, Agent, or Firm* — Schwegman Lundberg & Woessner, P.A.

(57) ABSTRACT

Embodiments of a station (STA) and method for communication on primary and secondary channel resources are generally described herein. The STA may transmit a grant frame to indicate a transmission of a data payload by the STA during a grant period. The grant frame may indicate whether the data payload is to be transmitted on primary channel resources or on secondary channel resources. The STA may transmit the data payload to a destination STA on the secondary channel resources when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources.

24 Claims, 6 Drawing Sheets

(56) References Cited

U.S. PATENT DOCUMENTS

2017/0034823 A1    2/2017 Cariou et al.

OTHER PUBLICATIONS

"U.S. Appl. No. 14/813,581, Non Final Office Action dated Jun. 16, 2017", 24 pgs.
"U.S. Appl. No. 14/813,581, Notice of Allowance dated Nov. 1, 2017", 8 pgs.
"U.S. Appl. No. 14/813,581, Response filed Sep. 18, 2017 to Non Final Office Action dated Jun. 16, 2017", 14 pgs.
"Relevant portions of the IEEE 802.11ad—2012 Specification", IEEE, (Dec. 28, 2012), 60 pgs.
"Wireless LAN medium access control (MAC) and physical layer (PHY) specifications", IEEE, Amendment 3, Sections 8.3.1.13, 8.3.1.19, 9.33.7, 9.33.9, (Mar. 15, 2014).

* cited by examiner

STATION (STA) AND METHOD FOR COMMUNICATION ON PRIMARY AND SECONDARY CHANNEL RESOURCES

CROSS-REFERENCE TO RELATED APPLICATION

This application is a continuation of U.S. patent application Ser. No. 14/813,581, filed Jul. 30, 2015, which is incorporated by reference herein in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard, the IEEE 802.11ax study group (SG) (named DensiFi) or IEEE 802.11ay. Some embodiments relate to high-efficiency (HE) wireless or high-efficiency WLAN or Wi-Fi (HEW) communications. Some embodiments relate to enhanced directional multi gigabit (EDMG) communication. Some embodiments relate to communication on primary channel resources and secondary channel resources. Some embodiments relate to signaling of channel resource allocations, such as signaling with grant frames.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios. As another example, Enhanced Directional Multi Gigabit (EDMG) communication (such as communication according to IEEE 802.11ay) may enable data rates similar to or greater than those provided by 802.11ac, which may be applicable in some scenarios in which high data rates may be required.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
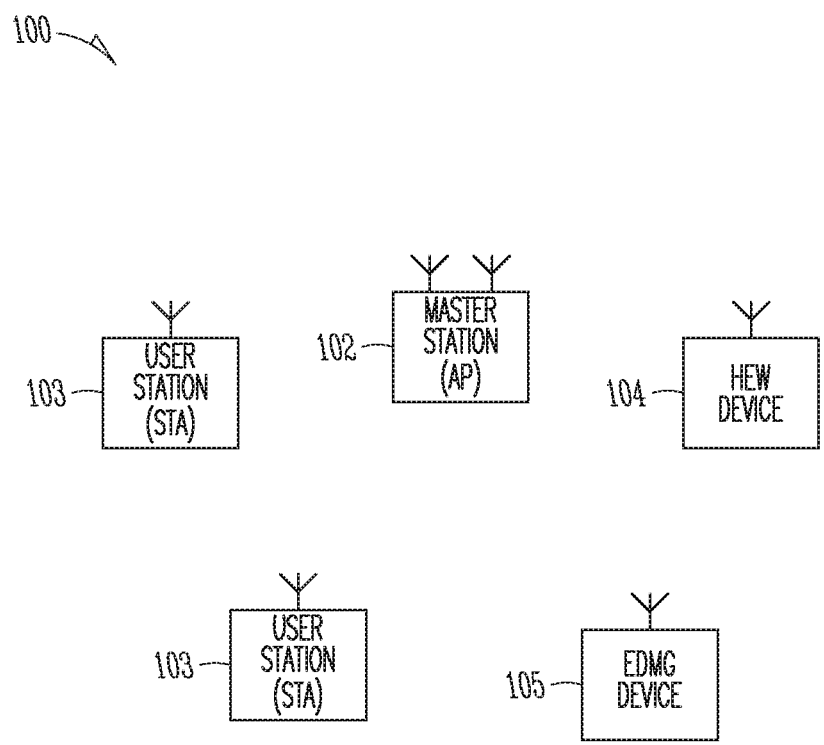
FIG. 1 illustrates a wireless network in accordance with some embodiments.

FIG. 1 illustrates a wireless network in accordance with some embodiments. In some embodiments, the network 100 may be an Enhanced Directional Multi Gigabit (EDMG) network. In some embodiments, the network 100 may be a High Efficiency Wireless Local Area Network (HEW) network. In some embodiments, the network 100 may be a Wireless Local Area. Network (WLAN) or a Wi-Fi network. These embodiments are not limiting, however, as some embodiments of the network 100 may include a combination of such networks. As an example, the network 100 may support EDMG devices in some cases, non EDMG devices in some cases, and a combination of EDMG devices and non EDMG devices in some cases. As another example, the network 100 may support HEW devices in some cases, non HEW devices in some cases, and a combination of HEW devices and non HEW devices in some cases. As another example, some devices supported by the network 100 may be configured to operate according to EDMG operation and/or HEW operation and/or legacy operation. Accordingly, it is understood that although techniques described herein may refer to a non EDMG device, an EDMG device, a non HEW device or an HEW device, such techniques may be applicable to any or all such devices in some cases.

The network 100 may include any number (including zero) of master stations (STA) 102, user stations (STAs) 103, HEW stations 104 (HEW devices), and EDMG stations 105 (EDMG devices). It should be noted that in some embodiments, the master station 102 may be a stationary non-mobile device, such as an access point (AP). In some embodiments, the STAs 103 may be legacy stations. These embodiments are not limiting, however, as the STAs 103 may be HEW devices or may support HEW operation in some embodiments. In some embodiments, the STAs 103 may be EDMG devices or may support EDMG operation. It should be noted that embodiments are not limited to the number of master STAs 102, STAs 103, HEW stations 104 or EDMG stations 105 shown in the example network 100 in FIG. 1. The master station 102 may be arranged to communicate with the STAs 103 and/or the HEW stations 104 and/or the EDMG stations 105 in accordance with one or more of the IEEE 802.11 standards. In accordance with some HEW embodiments, an AP may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, a first STA 103 may transmit a grant frame to a second STA 103 to indicate a transmission of a data payload on primary channel resources or on secondary channel resources. The first STA 103 may receive an acknowledgement message for the grant frame from the second STA 103. The first STA 103 may transmit a data payload to the second STA 103 in the channel resources indicated in the grant frame. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth, in some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a carrier frequency of 60 GHz.

In some embodiments, primary channel resources may include one or more such bandwidths, which may or may not be contiguous in frequency. As a non-limiting example, channel resources spanning a 2.16 GHz or 4.32 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth, 4.32 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LIT). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

Figure 2:
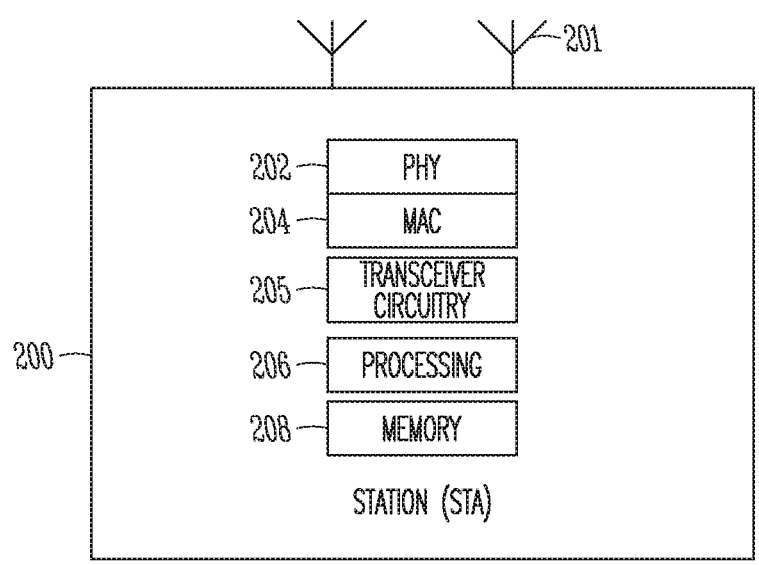
FIG. 2 illustrates a station (STA) in accordance with some embodiments.

FIG. 2 illustrates a station (STA) in accordance with some embodiments. The STA 200 may be suitable for use as an STA 103 as depicted in FIG. 1. In addition, the STA 200 may also be suitable for use as an HEW device 104 as shown in FIG. 1, such as an HEW station. In some embodiments, the STA 200 may be suitable for use as an EDMG device 105 as shown in FIG. 1, such as an EDMG station. The STA 200 may include physical layer circuitry 202 and a transceiver 205, one or both of which may enable transmission and reception of signals to and from the master station 102, HEW devices 104, EDMG devices 105, other STAs 103, APs and/or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers. The STA 200 may also include medium access control layer (MAC) circuitry 204 for controlling access to the wireless medium. The STA 200 may also include processing circuitry 206 and memory 208 arranged to perform the operations described herein.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

In some embodiments, the STA 200 and/or the master station (such as an AP) 104 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200 and/or the master station (such as an AP) 104 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 200 and/or the master station (such as an AP) 104 and/or other device may include one or more of a keyboard, a display, a non-volatile memory port, multiple antennas, a graphics processor, an application processor, speakers, and other mobile device elements. The display may be an LCD screen including a touch screen.

Although the STA 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 200 may include various components of the STA 200 as shown in FIG. 2. Accordingly, techniques and operations described herein that refer to the STA 200 (or 103 or 104) may be applicable to an apparatus for an STA.

In some embodiments, the STA 200 may be configured as an HEW device 104 (FIG. 1) and/or an EDMG device 105 (FIG. 1), and may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards and/or proposed EDMG standards, although the scope of the invention is not limited in this respect as they may also be suitable to transmit and/or receive communications in accordance with other techniques and standards. In some other embodiments, the STA 200 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the STA 103 may transmit a grant frame to indicate a transmission of a data payload by the STA 103 during a grant period. The grant frame may indicate whether the data payload is to be transmitted on primary channel resources or on secondary channel resources. The STA 103 may transmit the data payload to a destination STA 103 on the secondary channel resources when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources. When the grant frame indicates that the data payload is to be transmitted on the primary channel resources, the grant frame may be transmitted on the primary channel resources and the STA 103 may refrain from transmission of the grant frame on the secondary channel resources. These embodiments will be described in more detail below.

In some embodiments, the channel resources may be used for downlink transmission by the AP 102 and for uplink transmissions by the STAs 103. That is, a time-division duplex (TDD) format may be used. In some embodiments, the channel resources may be used for direct communication between one or more STAs 103. For instance, the STAs 103 may be configured to communicate in a peer-to-peer (P2P) mode. As another example, the STAs 103 may be configured to communicate in a non Port Control Protocol/AP (non-PCP/AP) mode.

In some cases, the channel resources may include multiple channels, such as the 20 MHz channels or 2.16 GHz channels previously described. The channels may include multiple sub-channels or may be divided into multiple sub-channels for the uplink transmissions to accommodate multiple access for multiple STAs 103. The downlink transmissions and/or the direct transmissions between STAs 103 may or may not utilize the same format.

In some embodiments, the sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax and/or 802.11ay), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 3:
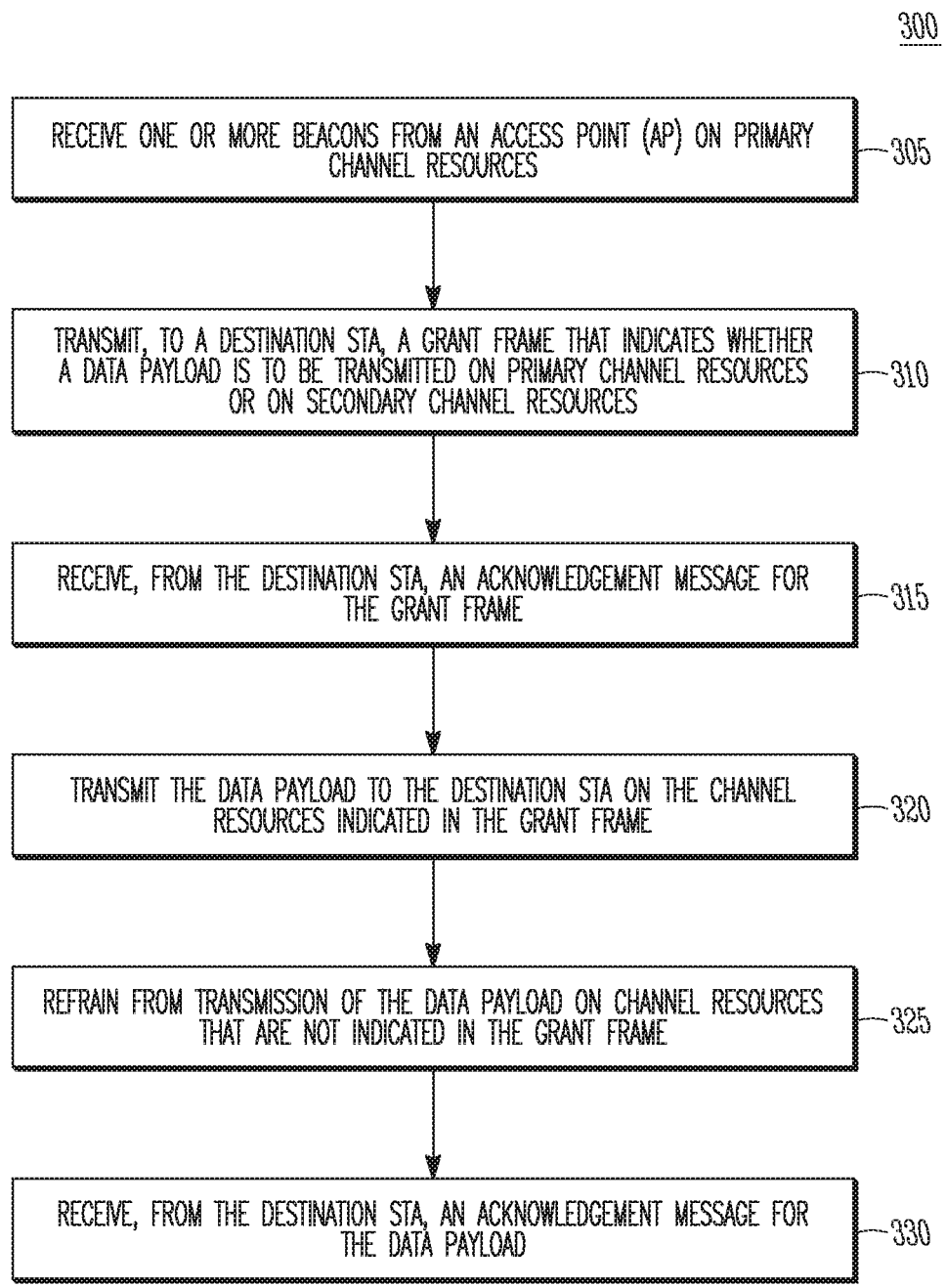
FIG. 3 illustrates the operation of a method of communication using primary and secondary channel resources in accordance with some embodiments.

FIG. 3 illustrates the operation of a method of communication using primary and secondary channel resources in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-6, although it is understood that the method 300 may be practiced with any other suitable systems, interfaces and components.

In addition, while the method 300 and other methods described herein may refer to STAs 103 and APs 102 operating in accordance with 802.11 or other standards, embodiments of those methods are not limited to just those devices and may also be practiced on other mobile devices, such as an EDMG STA, EDMG AP, HEW STA, an HEW AP, an Evolved Node-B (eNB) or User Equipment (UE). In some embodiments, the STA 103 described in the method 300 may be an EDMG STA 103 while the AP 102 may be an EDMG AP 102. In some embodiments, the STA 103 described in the method 300 may be an HEW STA 103 while the AP 102 may be an HEW AP 102. The method 300 and other methods described herein may also be practiced by wireless devices configured to operate in other suitable types of wireless communication systems, including systems configured to operate according to various Third Generation Partnership Project (3GPP) Long Term Evolution (LTE) standards. The method 300 may also refer to an apparatus for an STA 103 and/or AP 102 or other device described above.

In some embodiments, the method 300 and other methods disclosed herein may include direct communication between STAs 103, such as transmission and/or reception of payloads, packets, signals, messages or other. In some embodiments, the method 300 and other methods described herein during a contention based access protocol (CBAP) phase.

In some embodiments, the STA 103 may be configured to operate as both a source STA 103 and as a destination STA 103. As an example, the STA 103 may operate as a source STA 103 when transmitting data to another STA 103 or other device. As another example, the STA 103 may operate as a destination STA 103 when receiving data from another STA 103 or other device. As another example, the STA 103 may be configured to perform one or more methods for source STA 103 operation and may be configured to perform one or more methods for destination STA 103 operation. In some cases, the STA 103 may be configured to perform at least one method for source STA 103 operation and at least one method for destination STA 103 operation during overlapping time periods. For instance, the STA 103 may operate as both a source STA 103 and as a destination STA 103 simultaneously.

In some embodiments, the method 300 may be practiced by an STA 103 that may be configured (at least partly) to operate as a source STA 103. Some descriptions of those embodiments may therefore refer to the STA 103 that practices the method 300 as a "source STA." Such references in this and other methods are not limiting, however, and it is understood that some STAs 103 may be configured to practice methods associated with either source STAs 103 or destination STAs 103.

At operation 305 of the method 300, the STA 103 may receive one or more beacon frames from an AP 102. In some embodiments, the beacon frames may be received on primary channel resources. In some embodiments, the STA 103 may be configured to operate in a wireless local area network (W-LAN) in which the primary channel resources are allocated at least partly for transmission of the beacon frames by the AP 102. In some cases, secondary channel resources that may be available for data transmissions or other transmissions may be restricted from transmission of the beacon frames by the AP 102. That is, beacon transmission may be performed in the primary channel resources and not performed in the secondary channel resources.

It should also be pointed out that embodiments are not limited to primary and secondary channel resources. As an example, additional channel resources, such as tertiary or other, may be available in some cases. Such resources may be configured and/or used in a similar manner as secondary resources in some cases. For instance, the network 100 may also restrict transmission of beacon frames on the tertiary or other channel resources. Accordingly, some of the embodiments described may be modified to include such tertiary channel resources.

In some embodiments, the beacon frame may include timing information and/or other control information that may enable STAs 103 to synchronize to the network 100. In some embodiments, the beacon frame may be transmitted periodically and its transmission times and/or transmission intervals may enable STAs 103 to determine a common reference time. Accordingly, STAs 103 may operate according to the common reference time for transmission and/or reception of frames and/or signals.

At operation 310, the source STA 103 may transmit a grant frame to a destination STA 103. The grant frame may indicate a transmission of a data payload by the source STA 103 to the destination STA 103 during a grant period. In some embodiments, the grant frame may indicate whether the data payload is to be transmitted on the primary channel resources or on the secondary channel resources. In addition, the grant frame may indicate a duration of the grant period in some embodiments. As an example, the duration for the grant frame may be equal to or may be based on an ending time of the grant period. As another example, the duration for the grant frame may be equal to or may be based on an ending time of the transmission of the grant frame.

As another example, the duration for the grant frame may be equal to or may be based on a duration before a starting time of the transmission of the data payload (which may be referred to as a "rendez-vous" in some cases). As such, a rendez-vous may be scheduled on the secondary channel at a time that may be after the grant frame exchange or may be later than the end of the grant frame exchange. An "immediate rendez-vous" may be scheduled to occur right after the grant frame exchange. A "delayed rendez-vous" may be scheduled to occur after a delay with respect to the grant frame exchange. The type of rendez-vous (delayed, immediate or other) may be indicated by the grant frame by inclusion of an indicator, such as a one bit indicator to indicate delayed or immediate. The type of rendez-vous (delayed, immediate or other) may also be indicated by the grant frame implicitly by appropriate setting of the allocation duration. The rendez-vous may be set to occur right after the end of the grant frame in case of an immediate rendez-vous or may be set to a later time in case of a delayed rendez-vous. This example is not limiting, however, as the rendez-vous time (or other time) may be indicated by the grant frame using other suitable techniques.

The grant frame may include identifiers of the source STA 103 and/or the destination STA 103 in some embodiments. As previously described, the grant frame may be transmitted according to a timing that is based at least partly on received beacon frames in some cases. For instance, a reference timing determined at least partly by the reception of the beacon frames may be used.

In some embodiments, when the grant frame indicates that the data payload is to be transmitted on the secondary channel resources, the grant frame may be transmitted on the primary channel resources and on the secondary channel resources. For instance, a duplicate transmission mode may be used to transmit a copy of the grant frame on both the primary channel resources and on the secondary channel resources. In some cases, the transmission of the grant frame on both the primary and the secondary channel resources may enable the destination STA 103 to monitor either the primary or the secondary channel resources for grant frames.

In some embodiments, when the grant frame indicates that the data payload is to be transmitted on the primary channel resources, the source STA 103 may transmit the grant frame on the primary channel resources and may refrain from transmission of the grant frame on the secondary channel resources. As an example, the source STA 103 may refrain from usage of the duplicate transmission mode previously described when the data payload is transmitted on the primary channel resources. As another example, the duplicate transmission mode may be reserved for cases when the secondary channel resources are used for transmission of the data payload. As another example, in some cases the STA 103 may transmit the grant frame on the primary channel, may refrain from transmission of the grant frame on the secondary channel, and may transmit the data payload on the secondary channel.

In some embodiments, the grant frame may be transmitted according to one or more directional paths between the source STA 103 and the destination STA 103. For instance, transmit beam-forming and/or receive beam-forming may be used. Accordingly, other STAs 103 for which the grant frame is not intended may not be able to decode the grant frame in some cases. In such cases, the grant frame also may not interfere with potential reception of other signals (like other grant frames) by those other STAs 103. That is, the directional transmission may have a reduced impact on operation of other STAs 103 in comparison to a grant frame transmitted in a non-directional manner.

At operation 315, the source STA 103 may receive, from the destination STA 103, an acknowledgement message for the grant frame transmitted by the source STA 103. In some embodiments, when the grant frame indicates that the data payload is to be transmitted on the secondary channel resources, the source STA 103 may receive an acknowledgement message for the grant frame from the destination STA 103 on the secondary channel resources. For instance, the secondary channel resources may be used for exchanging of both the data payload and the acknowledgement message of the grant frame in some cases. In some embodiments, when the primary channel resources are used for transmission of the data payload, the acknowledgement message may be transmitted by the destination STA 103 on the primary channel resources.

In some embodiments, the grant frame may be transmitted by the source STA 103 on the primary channel and may indicate that the data payload is to be transmitted on the secondary channel. In such embodiments, the acknowledgement message for the grant frame may be received by the source STA 103 (and transmitted by the destination STA 103) on the primary channel. In addition, the grant frame and the acknowledgement message for the grant frame may be restricted to the primary channel in some of those embodiments.

In some embodiments, a request-to-send (RTS) frame that may be included in one or more 802.11 or other standards may be used instead of the grant frame to provide the same or similar functionality. In some embodiments, modified RTS frames or other frames may be used instead of the grant frame. In some embodiments, a clear-to-send (CTS) frame that may be included in one or more 802.11 or other standards may be used instead of the acknowledgement message for the grant frame to provide the same or similar functionality. In some embodiments, modified CTS frames or other frames may be used instead of the acknowledgement message for the grant frame. Accordingly, in some embodiments, an RTS/CTS exchange may be used instead of the grant frame and acknowledgement message for the grant frame.

At operation 320, the data payload may be transmitted by the source STA 103 to the destination STA 103 on the channel resources indicated in the grant frame. At operation 325, the source STA 103 may refrain from transmission of the data payload on channel resources that are not indicated in the grant frame. For instance, the primary channel resources or the secondary channel resources may be indicated in the grant frame and may be used for the data payload transmission. It should be noted that embodiments are not limited to primary and secondary channel resources, as tertiary channel resources or other channel resources may also be used in some cases.

As another example, the data payload may be transmitted to the destination STA 103 on the secondary channel resources during the grant period when the grant frame indicates that the data payload is to be transmitted on the secondary channel resources. In addition, the source STA 103 may refrain from transmission of the data payload on the primary channel resources when the grant frame indicates that the data payload is to be transmitted on the secondary channel resources.

As another example, the data payload may be transmitted to the destination STA 103 on the primary channel resources during the grant period when the grant frame indicates that the data payload is to be transmitted on the primary channel resources. In addition, the source STA 103 may refrain from transmission of the data payload on the secondary channel resources when the grant frame indicates that the data payload is to be transmitted on the primary channel resources.

As another example, the source STA 103 may be configured to transmit the data payload in either the primary or the secondary channel resources as indicated in the grant frame, but not in both the primary and the secondary channel resources.

In some embodiments, the data payload may be transmitted at least partly in response to the reception of the acknowledgement message of the grant frame from the destination STA 103. For instance, when a successful reception of the grant frame at the destination STA 103 is indicated, the data payload may be transmitted. In some embodiments, the transmission of the data payload may be delayed for a period of time after the reception of the acknowledgement message of the grant frame from the destination STA 103. The transmission may be performed at a later time, which may be after a random delay, fixed delay or other delay period.

At operation 330, the source STA 103 may receive an acknowledgement message for the data payload from the destination STA 103 for reception of the data payload at the destination STA 103. The acknowledgement message may include one or more indicators related to the reception of the data payload at the destination STA 103, such as whether or not the data payload was successfully received. As a non-limiting example, the channel resources (primary or secondary or other) indicated in the grant frame may also be used for the acknowledgement message for the data payload.

Figure 4:
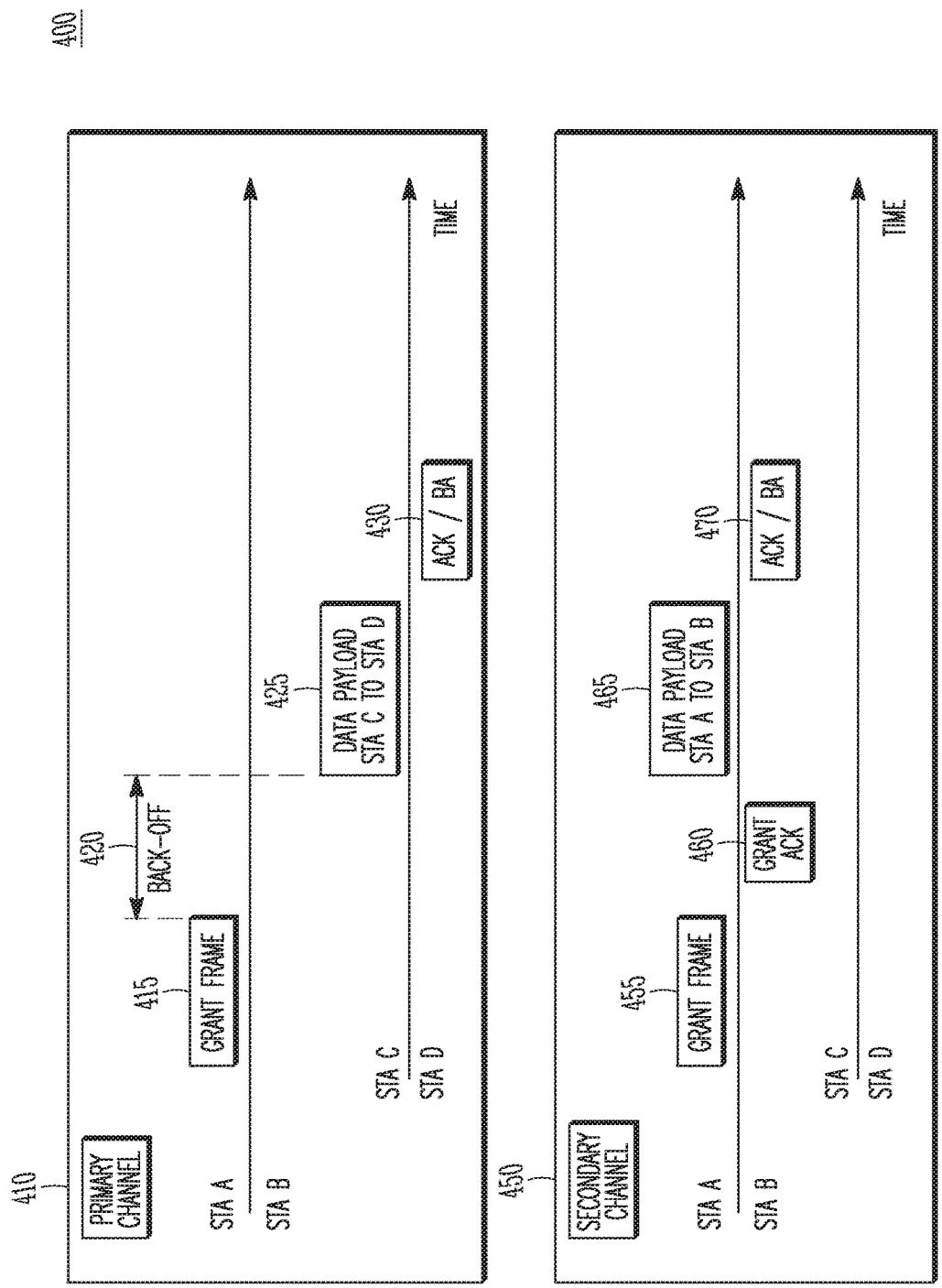
FIG. 4 illustrates an example scenario of communication using primary and secondary channel resources in accordance with some embodiments.

FIG. 4 illustrates an example scenario of communication using primary and secondary channel resources in accordance with some embodiments. It should be noted that the example scenario 400 may serve to illustrate some or all of the concepts and techniques described herein, but embodiments are not limited to the scenario 400. For instance, embodiments are not limited to the number of STAs 103 shown and are also not limited to primary and secondary channel resources. Embodiments are also not limited to the number or type of frames exchanged STAs 103. Embodiments are also not limited to the ordering or arrangement of the transmissions and receptions as shown in FIG. 4. It should also be noted that some embodiments may include exchanging of fewer frames than what is shown in FIG. 4. Some embodiments may include exchanging of additional frames or other elements not shown in FIG. 4.

In the example scenario 400, four STAs (A, B, C and D) may communicate using a combination of a primary channel 410 and a secondary channel 450. The grant frame 415 may be transmitted by STA A on the primary channel 410 and the grant frame 455 may be transmitted by STA A on the secondary channel 450. In some cases, the grant frame 455 may be a duplicate of the grant frame 415, although embodiments are not limited as such. In some cases, the grant frames 415 and 455 may not be exactly the same but may include some common information regarding the transmission of a data payload during a grant period.

The grant ACK 460 may be transmitted by STA B on the secondary channel 450 for acknowledgement of the reception of one of the grant frames 415 or 455. In this example scenario 400, the grant frames 415, 455 may indicate that the data payload 465 is to be transmitted on the secondary channel 450 as shown. A data ACK 470 may be transmitted on the secondary channel 450 by STA B to indicate reception of the data payload 465.

The data payload 425 may be transmitted by STA C to STA D on the primary channel 410, after a back-off period 420. As a non-limiting example, the back-off period 420 may be selected randomly by the transmitting STA C. In some embodiments, when the grant frame 415 is transmitted by STA A in a directional manner to STA B, it may be possible that STA C and/or STA D do not receive the grant frame 415 or that they are not affected by it. Accordingly, after the back-off period, STA C may transmit the data payload 425 on the primary channel 410. An acknowledgement 430 for the data payload 425 may be transmitted by STA D on the primary channel 410.

Figure 5:
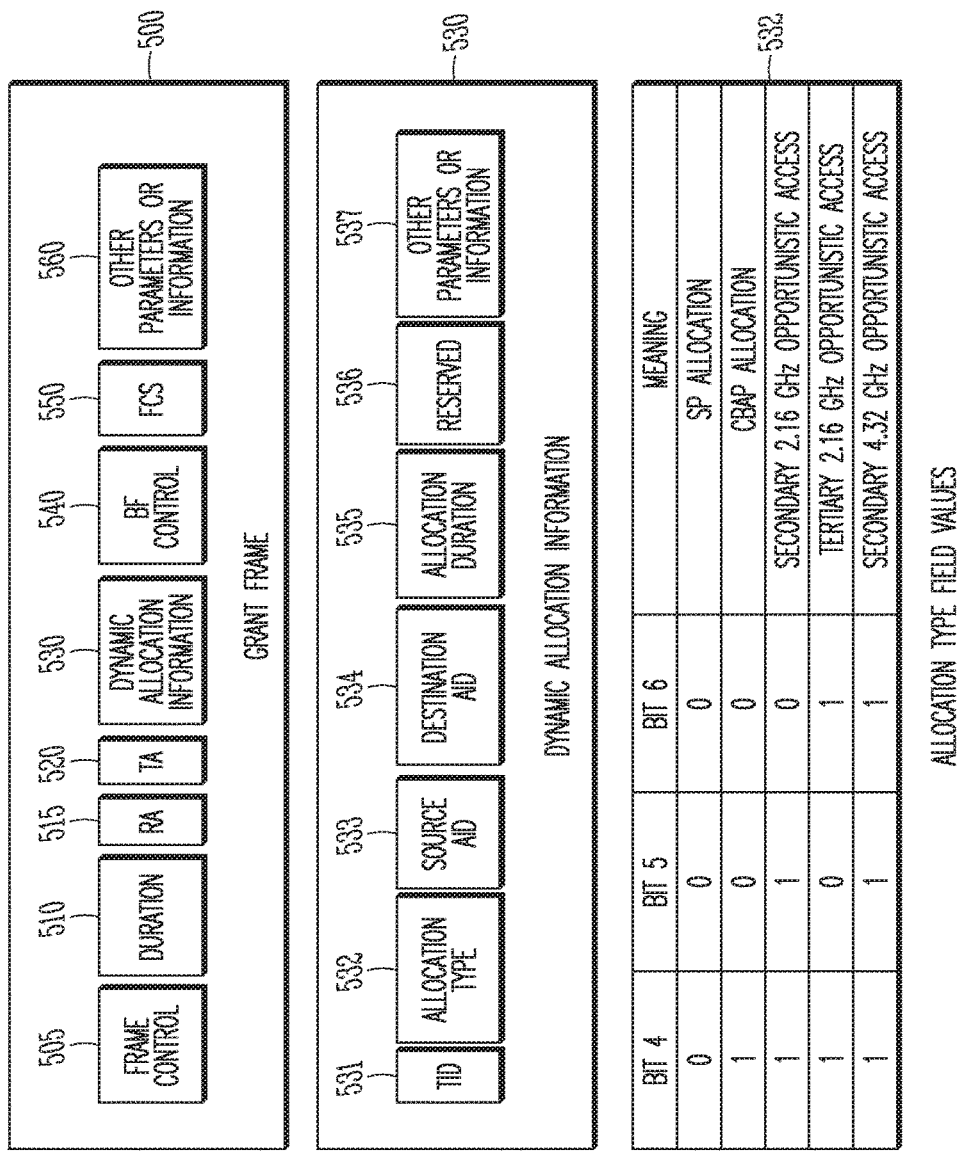
FIG. 5 illustrates an example of a grant frame in accordance with some embodiments.

FIG. 5 illustrates an example of a grant frame in accordance with some embodiments. The example grant frame 500 shown in FIG. 5 may illustrate some or all of the concepts described herein, but the scope of the embodiments is not limited by this example. In addition, formats and arrangements of the message and parameters as shown in FIG. 5 are also not limiting. Some embodiments of the grant frame 500 may include any or all of the parameters shown in FIG. 5. In some embodiments, the grant frame 500 may also include other similar parameters in addition to, or instead of, some of those parameters shown in FIG. 5.

The grant frame 500 may include a frame control header 505. The grant frame 500 may also include a duration 510 of the grant frame 500, which may be given in any suitable unit of time or number of bits, bytes or octets. The grant frame 500 may also include a receive address (RA) 515 and a transmitter address (TA) 520. As an example, the RA 515 may include an identifier of the destination STA 103. As another example, the TA 520 may include an identifier of the source STA 103. The grant frame 500 may include dynamic allocation information 530, which will be described in more detail below. The grant frame 500 may also include a beam-forming (BF) control field 540 and may also include a frame control sequence (FCS) 550 which may be or may be related to a cyclic redundancy check (CRC). In addition, the grant frame 500 may also include any number (including zero) of other parameters, information or data blocks 560, which may or may not be related to techniques and operations for communication on primary and secondary channel resources as described herein. As an example, control information for the grant frame 500 may be included.

The dynamic allocation information 530 may include any or all of the parameters shown in FIG. 5 (or similar parameters), and may also include any number (including zero) of other parameters, information or data blocks 537, which may or may not be related to techniques and operations for communication on primary and secondary channel resources as described herein. As a non-limiting example, the source AID 533 and the destination AID 534 may include identifiers of the source STA 103 and the destination STA 103. As another non-limiting example, the allocation duration 535 may include a duration (in time or in number of bits, bytes or octets) of the data payload to be transmitted during the grant period. As another non-limiting example, when a starting time of the data payload on the secondary channel is included in the grant frame, the allocation duration 535 may be used to communicate the starting time. In such cases, the allocation duration 535 may include the starting time, a sum of the starting time with the value in the duration field 510 or any suitable number that may be based at least partly on the starting time.

Several non-limiting example assignments for the allocation type 532 are also shown in FIG. 5. In this case, three bits (bit 4, bit 5, and bit 6) are used, but embodiments are not limited to this number of bits or arrangement of bits. As an example, the combination of "1-1-0" for bit4, bit5, and bit6 may indicate that the data payload is to be transmitted on a 2.16 GHz secondary channel. As another example, the combination of "1-0-1" for bit4, bit5, and bit6 may indicate that the data payload is to be transmitted on a 2.16 GHz tertiary channel. As another example, the combination of "1-1-1" for bit4, bit5, and bit6 may indicate that the data payload is to be transmitted on a 4.32 GHz secondary channel. In some embodiments, mappings like these or other mappings may be used to indicate the channel resources to be used for the data transmission.

As an example, the allocation duration 535 may be set to the same value used for the grant frame duration 510. In this case, STAs 103 that are not the destination STA 103 may set a network allocation vector when a grant frame ACK is not received.

As another example, the allocation duration 535 may be set to a remaining portion of the grant frame. Accordingly, STAs 103 on the primary channel 510 may not set the network allocation vector (NAV) further than the end of the grant frame. Therefore, other STAs 103, such as STA C and STA D in the scenario 400 of FIG. 4, may exchange data payloads after resuming an enhanced distributed channel access (EDCA) back-off countdown when the primary channel 510 becomes idle at the end of the transmission of the grant frame 515.

As another example, techniques may be used for the grant frame for which legacy STAs 103 may fail to detect the grant frame 515 or may be unable to detect the grant frame 515. Accordingly, those legacy STAs 103 may defer transmission based on PLCP header information such as rate and length.

As another example, another type of frame may be used instead of the grant frame. As such, legacy STAs 103 may fail to detect the other type of frame, and may defer transmission based on PUT header information such as rate and length.

As another example, the STA 103 that transmits the grant frame may be the destination STA 103 that receives the data payload from the source STA 103.

As another example, the duration of the grant ACK may be set accordingly such that the NAV of other STAs 103 (other than the destination STA 103) may be set until the end of the allocation (based on the allocation duration included in the grant frame). Accordingly, if STAs 103 receive the grant ACK frame on the primary channel 510, they may reset their NAV.

In some embodiments, protection may be provided on the primary channel against STAs 103 operating on the secondary channel that may return to the primary channel at the end of the allocation on the secondary channel. When STAs 103 return to the primary channel, they may collide with ongoing transmissions on the primary channel. Such collisions may be avoided or reduced using one or more techniques. As an example, a duration of the Transmit Opportunity (TxOP) on the primary channel, following the grant frame, may be restricted such that it does not exceed the duration of the allocation on the secondary channel (as defined in the allocation duration field in the grant frame). Accordingly, protection may be ensured or enabled with regards to the STAs 103 returning from the secondary channel. As another example, STAs 103 operating on the secondary channel may be restricted such that they do not intend transmissions on the primary channel sooner than the end of their allocation on the secondary channel.

As another example, STAs 103 returning to the primary channel after transmitting on the secondary channel may wait and sense the primary channel for a particular duration. For instance, a certain "ProbeDelay" parameter may be used and/or defined.

Figure 6:
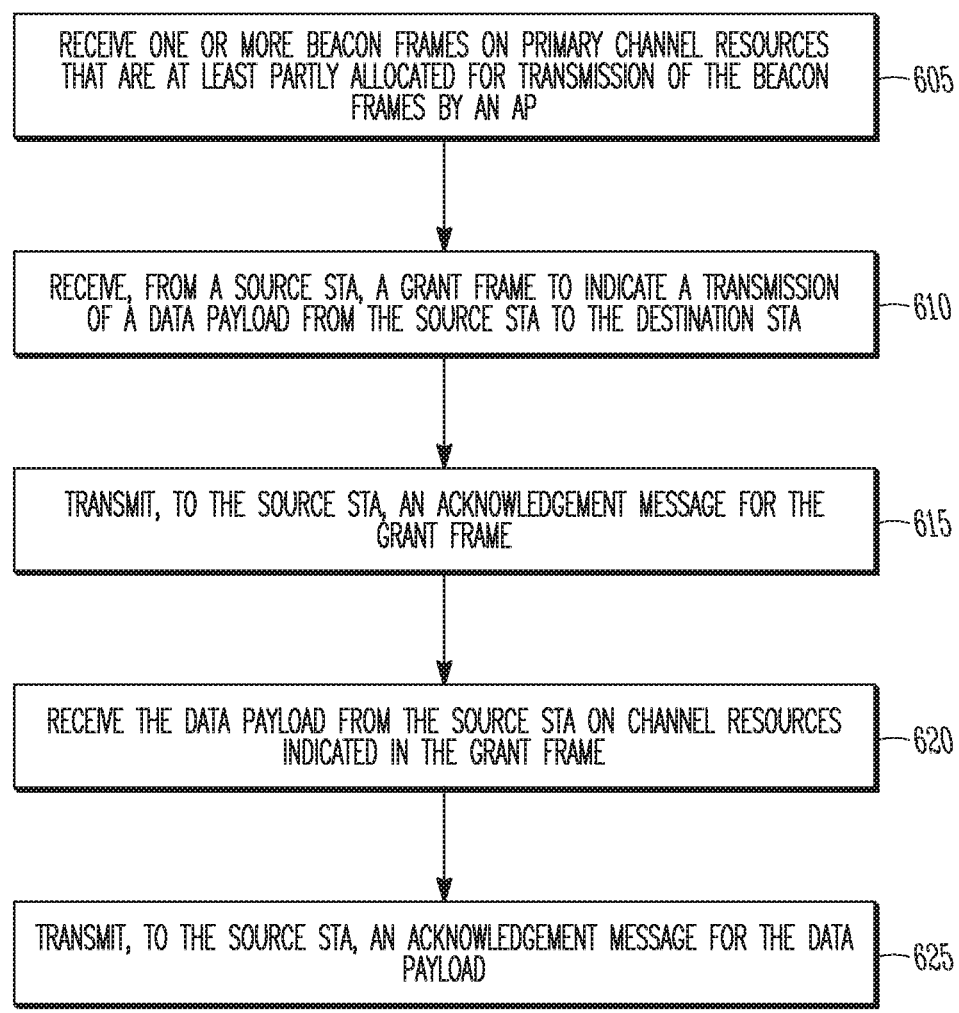
FIG. 6 illustrates the operation of another method of communication using primary and secondary channel resources in accordance with some embodiments.

FIG. 6 illustrates the operation of another method of communication using primary and secondary channel resources in accordance with some embodiments. As mentioned previously regarding the method 300, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may refer to APs, STAs, eNBs 104, UEs 102, EDMG APs, EDMG STAs, HEW APs, HEW STAs or other wireless or mobile devices. The method 600 may also refer to an apparatus for an STA 103 or other device described above.

It should be noted that the method 600 may be practiced at a destination STA 103 (or at an STA 103 configured to operate as a destination STA 103), and may include exchanging of signals or messages with a source STA 103. Similarly, the method 300 may be practiced at a source STA 103 (or at an STA 103 configured to operate as a source STA 103), and may include exchanging of signals or messages with a destination STA 103. In some cases, operations and techniques described as part of the method 300 may be relevant to the method 600. In addition, embodiments may include operations performed at the destination STA 103 that are reciprocal or similar to other operations described herein performed at the source STA 103. For instance, an operation of the method 600 may include reception of a frame by the destination STA 103 while an operation of the method 300 may include transmission of the same frame or similar frame by the source STA 103.

In addition, previous discussion of various techniques and concepts may be applicable to the method 600 in some cases, including the beacon frame, grant frame, acknowledgement messages, data payloads, primary channel resources, secondary channel resources, directional transmission and/or directional reception, and others. In addition, the example scenario 400 shown in FIG. 4 and/or the example grant frame 500 may also be applicable, in some cases.

In some embodiments, the method 600 may be practiced by an STA 103 that may be configured (at least partly) to operate as a destination STA 103. Some descriptions of those embodiments may therefore refer to the STA 103 that practices the method 300 as a "destination STA." Such references in this and other methods are not limiting, however, and it is understood that some STAs 103 may be configured to practice methods associated with either source STAs 103 or destination STAs 103.

At operation 605, the destination STA 103 may receive one or more beacon frames on primary channel resources that are at least partly allocated for transmission of the beacon frames by an AP 102. In some embodiments, the destination STA 103 may be configured to operate in a wireless local area network (W-LAN) in which the primary channel resources are allocated at least partly for transmission of the beacon frames by the AP 102 and secondary channel resources are restricted from transmission of the beacon frames by the AP 102. The beacon frames may be used by the destination STA 103 and by other STAs 103 for establishment of a common reference timing or system timing. Such timing may be used, in some cases, to determine when transmissions and/or receptions are performed.

At operation 610, the destination STA 103 may receive, from a source STA 103, a grant frame to indicate a transmission of a data payload, during a grant period, from the source STA 103 to the destination STA 103. In some embodiments, the grant frame may indicate whether the transmission of the data payload is to be performed on primary or secondary channel resources. The grant frame may also include a duration of the grant period, an identifier of the source STA 103 and/or an identifier of the destination STA 103, and may include additional information or parameters. As a non-limiting example, the grant frame 500 shown in FIG. 5 may be used. As another non-limiting example, the duration for the grant frame may be equal to or may be based on a duration before a starting time of the transmission of the data payload. As such, a rendez-vous may be scheduled on the secondary channel at a time that may be after the grant frame exchange or may be later than the end of the grant frame exchange. In some cases, techniques described herein for communication of such timing information for the rendez-vous may be used.

At operation 615, the destination STA 103 may transmit, to the source STA 103, an acknowledgement message for the grant frame. At operation 620, the destination STA 103 may receive the data payload from the source STA 103 on channel resources (such as primary, secondary or other) indicated in the grant frame. At operation 625, an acknowledgement message for the data payload may be transmitted to the source STA 103.

In some embodiments, when the grant frame is received on the primary channel resources, the grant frame may indicate that the data payload is to be transmitted on the primary channel resources or on the secondary channel resources. In some embodiments, when the grant frame is received on the secondary channel resources, the grant frame may indicate that the data payload is to be transmitted on the secondary channel resources and may not indicate transmission of the data payload on the primary channel resources.

An example of an apparatus for a station (STA) is disclosed herein. The apparatus may comprise transceiver circuitry and hardware processing circuitry. The STA may be configured to operate as a source STA. The hardware processing circuitry may configure the transceiver circuitry to transmit a grant frame to indicate a transmission of a data payload by the STA during a grant period. The grant frame may indicate whether the data payload is to be transmitted on primary channel resources or on secondary channel resources. The grant frame may further indicate a duration for the grant period. The hardware processing circuitry may further configure the transceiver circuitry to transmit the data payload to a destination STA on the secondary channel resources during the grant period when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources.

In some examples, the hardware processing circuitry may further configure the transceiver circuitry to refrain from transmission of the data payload on the primary channel resources when the grant frame indicates that the data payload is to be transmitted on the secondary channel resources. The hardware processing circuitry may further configure the transceiver circuitry to refrain from transmission of the data payload on the secondary channel resources when the grant frame indicates that the data payload is to be transmitted on the primary channel resources.

In some examples, when the grant frame indicates that the data payload is to be transmitted on the primary channel resources, the grant frame may be transmitted on the primary channel resources and the hardware processing circuitry may further configure the transceiver circuitry to refrain from transmission of the grant frame on the secondary channel resources. In some examples, the STA may be configured to operate in a wireless local area network (W-LAN) in which the primary channel resources may be allocated at least partly for transmission of beacon frames by an access point (AP) and the secondary channel resources may be restricted from transmission of the beacon frames by the AP.

In some examples, the grant frame may be transmitted according to a timing that is based at least partly on the beacon frames. In some examples, the grant frame may be transmitted according to one or more directional paths between the STA and the destination STA. In some examples, the hardware circuitry may further configure the transceiver circuitry to, when the grant frame indicates that the data payload is to be transmitted on the secondary channel resources, receive an acknowledgement message for the grant frame from the destination STA on the secondary channel resources. In some examples, the data payload may be transmitted at least partly in response to the reception of the acknowledgement message from the destination STA.

In some examples, the grant period may occur subsequent to the transmission of the grant frame and the grant frame may include a duration for the grant frame that may be based on an ending time of the grant period. In some examples, the grant period may occur subsequent to the transmission of the grant frame and the grant frame may include a duration for the grant frame that is based on an ending time of the transmission of the grant frame. In some examples, the grant frame may further include identifiers of the STA and the destination STA. In some examples, the apparatus may further comprise one or more antennas coupled to the transceiver circuitry for the transmission of the grant frame and the transmission of the data payload.

An example of a non-transitory computer-readable storage medium that stores instructions for execution by one or more processors to perform operations for communication by a station (STA) is also disclosed herein. The STA may be configured to operate as a source STA. The operations may configure the one or more processors to receive one or more beacon frames on primary channel resources that may be at least partly allocated for transmission of the beacon frames by an access point (AP). The operations may further configure the one or more processors to transmit a grant frame to indicate a transmission of a data payload to a destination STA on the primary channel resources or on secondary channel resources. The operations may further configure the one or more processors to transmit the data payload to the destination STA. When the data payload is transmitted on the secondary channel resources, the grant frame may be transmitted on the primary channel resources and on the secondary channel resources. When the data payload is transmitted on the primary channel resources, the grant frame may be transmitted on the primary channel resources.

In some examples, the operations may further configure the one or more processors to, when the data payload is transmitted on the primary channel resources, refrain from transmission of the grant frame on the secondary channel resources. In some examples, the data payload may be transmitted during a grant period indicated by the grant frame. In some examples, the grant frame may be transmitted according to a system timing that is based at least partly on the received beacon frames. In some examples, the grant frame may be transmitted according to one or more directional paths between the STA and the destination STA. In some examples, the operations may further configure the one or more processors to receive an acknowledgement message for reception of the grant frame at the destination STA. When the data payload is transmitted on the primary channel resources, the acknowledgement message may be received on the primary channel resources. When the data payload is transmitted on the secondary channel resources, the acknowledgement message may be received on the secondary channel resources.

An example of a method of communication performed by a station (STA) is also disclosed herein. The STA may be configured to operate as a source STA. The method may comprise transmitting a grant frame to indicate a transmission of a data payload by the STA during a grant period. The grant frame may indicate whether the data payload is to be transmitted on primary channel resources or on secondary channel resources. The grant frame may further indicate a duration for the grant period. The method may further comprise transmitting the data payload to a destination STA on the secondary channel resources during the grant period when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources.

In some examples, the method may further comprise refraining from transmission of the data payload on the primary channel resources when the grant frame indicates that the data payload is to be transmitted on the secondary channel resources. The method may further comprise refraining from transmission of the data payload on the secondary channel resources when the grant frame indicates that the data payload is to be transmitted on the primary channel resources.

Another example of an apparatus for a station (STA) is also disclosed herein. The STA may be configured to operate as a destination STA. The apparatus may comprise transceiver circuitry and hardware processing circuitry. The hardware processing circuitry may configure the transceiver circuitry to receive one or more beacon frames on primary channel resources that may be at least partly allocated for transmission of the beacon frames by an access point (AP). The hardware processing circuitry may further configure the transceiver circuitry to receive, from a source STA, a grant frame to indicate a transmission of a data payload from the source STA to the STA on the primary channel resources or on secondary channel resources. The hardware processing circuitry may further configure the transceiver circuitry to receive the data payload from the source STA on the channel resources indicated in the grant frame.

In some examples, the STA may be configured to operate in a wireless local area network (W-LAN) in which the primary channel resources may be allocated at least partly for transmission of the beacon frames by the AP and the secondary channel resources may be restricted from transmission of the beacon frames by the AP. In some examples, when the grant frame is received on the primary channel resources, the grant frame may indicate that the data payload is to be transmitted on the primary channel resources or on the secondary channel resources. When the grant frame is received on the secondary channel resources, the grant frame may indicate that the data payload is to be transmitted on the secondary channel resources.

In some examples, the grant frame may indicate a duration of the grant period and may include identifiers of the STA and the source STA. In some examples, the apparatus may further comprise one or more antennas coupled to the transceiver circuitry for the reception of the beacons, the grant frame, and the data payload.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an enhanced directional multi-gigabit (EDMG) station (STA), the apparatus comprising: memory; and processing circuitry coupled to the memory, the EDMG STA configurable to operate on multiples of a 2.16 GHz channel, the processing circuitry to, when the STA is configured to operate as a source STA (SSTA):
   encode a grant frame for transmission to indicate a transmission to a destination EDMG station (DSTA), the DSTA being a peer EDMG STA, the grant frame to indicate intent to transmit data by the SSTA to the DSTA,
   wherein the grant frame is encoded for transmission, the grant frame to include:
      a dynamic allocation information field;
      control signaling that includes a bitmap indicating a channel to be used for transmission of the data, wherein the channel is indicated by the bitmap, the bitmap being configurable to indicate one or more multiples of a 2.16 GHz channel, and configurable to indicate a 2.16 GHz bandwidth channel and a 4.32 GHz bandwidth channel, the bitmap occurring after a start of the dynamic allocation information field;
   wherein the channels comprise a primary channel for transmission of the grant frame and the non-primary channel for transmission of the data, the primary channel being a 2.16 GHz channel, the non-primary channel being one or more multiples of a 2.16 GHz channel;
   wherein the grant frame is further encoded to include a source association identifier (AID) for the SSTA, and a destination AID for the DSTA; and
   wherein the processing circuitry is further configured to:
      process a grant acknowledgement frame received from the DSTA, the grant acknowledgment frame acknowledging receipt of the grant frame by the DSTA; and
      encode the data for transmission to the DSTA on the non-primary channel when the bitmap of the grant frame indicates that the data is to be transmitted on the non-primary channel, and
      encode the data for transmission to the DSTA on the primary channel when the bitmap of the grant frame indicates that the data is to be transmitted on the primary channel.

2. The apparatus according to claim 1, wherein the SSTA processing circuitry is further to:
   operate in a wireless local area network (WLAN); and
   encode a beacon frame for transmission wherein a transmission time of the grant frame is based on the beacon frame.

3. The apparatus according to claim 1, the apparatus further comprising one or more directional antennas coupled to the transceiver circuitry for the transmission of the grant frame and the transmission of the data.

4. The apparatus according to claim 1, wherein communications of the grant frame and data are performed in channel resources having a carrier frequency of 60 GHz.

5. The apparatus according to claim 1, wherein communications of the grant frame and data are performed utilizing a multiple-input multiple-output technique.

6. The apparatus according to claim 1, wherein:
the grant frame is encoded to include, in sequence:
a frame control header;
a duration of the grant frame;
a receiver address;
a transmitter address;
the dynamic allocation information field;
a beam-forming control field; and
a frame control sequence; and
the dynamic allocation information field is encoded to further include:
an allocation duration that includes a duration of the data to be transmitted.

7. A computer program product comprising one or more tangible computer readable non-transitory storage media comprising computer-executable instructions operable to, when executed by processing circuitry of a device for an enhanced directional multi-gigabit (EDMG) station (STA), the EDMG STA configurable to operate on multiples of a 2.16 GHz channel, the processing circuitry to, when the STA is configured to operate as a source STA (SSTA), configure the device to:
encode a grant frame for transmission to indicate a transmission to a destination EDMG station (DSTA), the DSTA being a peer EDMG STA, the grant frame to indicate intent to transmit data by the SSTA to the DSTA,
wherein the grant frame is encoded for transmission, the grant frame to include:
a dynamic allocation information field;
control signaling that includes a bitmap indicating a channel to be used for transmission of the data, wherein the channel is indicated by the bitmap, the bitmap being configurable to indicate one or more multiples of a 2.16 GHz channel, and configurable to indicate a 2.16 GHz bandwidth channel and a 4.32 GHz bandwidth channel, the bitmap occurring after a start of the dynamic allocation information field;
wherein the channels comprise a primary channel for transmission of the grant frame and the non-primary channel for transmission of the data, the primary channel being a 2.16 GHz channel, the non-primary channel being one or more multiples of a 2.16 GHz channel;
wherein the grant frame is further encoded to include a source association identifier (AID) for the SSTA, and a destination AID for the DSTA; and
wherein the processing circuitry is further configured to:
process a grant acknowledgement frame received from the DSTA, the grant acknowledgment frame acknowledging receipt of the grant frame by the DSTA; and
encode the data for transmission to the DSTA on the non-primary channel when the bitmap of the grant frame indicates that the data is to be transmitted on the non-primary channel, and
encode the data for transmission to the DSTA on the primary channel when the bitmap of the grant frame indicates that the data is to be transmitted on the primary channel.

8. The computer program product according to claim 7, wherein the computer program product configures the device to further:
operate in a wireless local area network (WLAN); and
encode a beacon frame for transmission wherein a transmission time of the grant frame is based on the beacon frame.

9. The computer program product according to claim 7, wherein the computer program product configures the device to further transmit the grant frame and data over one or more directional antennas coupled to the transceiver circuitry.

10. The computer program product according to claim 7, wherein communications of the grant frame and data are performed in channel resources having a carrier frequency of 60 GHz.

11. The computer program product according to claim 7, wherein communications of the grant frame and data are performed utilizing a multiple-input multiple-output technique.

12. The computer program product according to claim 7, wherein:
the grant frame is encoded to include, in sequence:
a frame control header;
a duration of the grant frame;
a receiver address;
a transmitter address;
the dynamic allocation information field;
a beam-forming control field; and
a frame control sequence; and
the dynamic allocation information field is encoded to further include:
an allocation duration that includes a duration of the data to be transmitted.

13. An apparatus for an enhanced directional multi-gigabit (EDMG) station (STA), the apparatus comprising: memory; and processing circuitry coupled to the memory, the EDMG STA configurable to operate on multiples of a 2.16 GHz channel, the processing circuitry to, when the STA is configured to operate as a destination STA (DSTA):
decode a received grant frame that indicates a transmission from a source EDMG station (SSTA), the SSTA being a peer EDMG STA, the grant frame to indicate intent to transmit data by the SSTA to the DSTA,
wherein the grant frame is decoded and includes:
a dynamic allocation information field;
control signaling that includes a bitmap indicating a channel to be used by the SSTA for transmission of the data, wherein the channel is indicated by the bitmap, the bitmap being configurable to indicate one or more multiples of a 2.16 GHz channel, and configurable to indicate a 2.16 GHz bandwidth channel and a 4.32 GHz bandwidth channel, the bitmap occurring after a start of the dynamic allocation information field;
wherein the channels comprise a primary channel for transmission of the grant frame and the non-primary channel for transmission of the data, the primary channel being a 2.16 GHz channel, the non-primary channel being one or more multiples of a 2.16 GHz channel;
wherein the grant frame further includes a source association identifier (AID) for the SSTA, and a destination AID for the DSTA; and
wherein the processing circuitry is further configured to:
encode a grant acknowledgement frame for transmission to the SSTA, the grant acknowledgment frame acknowledging receipt of the grant frame by the DSTA; and
decode the data transmitted from the SSTA on the non-primary channel when the bitmap of the grant frame indicates that the data is to be transmitted on the non-primary channel, and decode the data transmitted from the SSTA on the primary channel when the bitmap of the grant frame indicates that the data is to be transmitted on the primary channel.

14. The apparatus according to claim 13, wherein the DSTA processing circuitry is further to:

operate in a wireless local area network (WLAN); and decode a beacon frame wherein a reception time of the grant frame is based on the beacon frame.

15. The apparatus according to claim 13, the apparatus further comprising one or more directional antennas coupled to the transceiver circuitry for the reception of the grant frame and the reception of the data.

16. The apparatus according to claim 13, wherein communications of the grant frame and data are performed in channel resources having a carrier frequency of 60 GHz.

17. The apparatus according to claim 13, wherein communications of the grant frame and data are performed utilizing a multiple-input multiple-output technique.

18. The apparatus according to claim 13, wherein:

the decoded grant frame includes, in sequence:
  a frame control header;
  a duration of the grant frame;
  a receiver address;
  a transmitter address;
  the dynamic allocation information field;
  a beam-forming control field; and
  a frame control sequence; and the decoded dynamic allocation information field further includes:
  an allocation duration that includes a duration of the data to be received.

19. An apparatus for an enhanced directional multi-gigabit (EDMG) station (STA) configurable to operate on multiples of a 2.16 GHz channel, comprising, when the STA is configured to operate as a destination STA (DSTA):

means for decoding a received grant frame that indicates a transmission from a source EDMG station (SSTA), the SSTA being a peer EDMG STA, the grant frame to indicate intent to transmit data by the SSTA to the DSTA, wherein the grant frame is decoded and includes:
  a dynamic allocation information field;
  control signaling that includes a bitmap indicating a channel to be used by the SSTA for transmission of the data, wherein the channel is indicated by the bitmap, the bitmap being configurable to indicate one or more multiples of a 2.16 GHz channel, and configurable to indicate a 2.16 GHz bandwidth channel and a 4.32 GHz bandwidth channel, the bitmap occurring after a start of the dynamic allocation information field;

wherein the channels comprise a primary channel for transmission of the grant frame and the non-primary channel for transmission of the data, the primary channel being a 2.16 GHz channel, the non-primary channel being one or more multiples of a 2.16 GHz channel;

wherein the grant frame further includes a source association identifier (AID) for the SSTA, and a destination AID for the DSTA; and the apparatus further comprising:

means for encoding a grant acknowledgement frame for transmission to the SSTA, the grant acknowledgment frame acknowledging receipt of the grant frame by the DSTA; and means for decoding the data transmitted from the SSTA on the non-primary channel when the bitmap of the grant frame indicates that the data is to be transmitted on the non-primary channel; and means for decoding the data transmitted from the SSTA on the primary channel when the bitmap of the grant frame indicates that the data is to be transmitted on the primary channel.

20. The apparatus according to claim 19, further comprising:

means for operating in a wireless local area network (WLAN); and means for decoding a beacon frame wherein a reception time of the grant frame is based on the beacon frame.

21. The apparatus according to claim 19, the apparatus further comprising means for the reception of the grant frame and the reception of the data.

22. The apparatus according to claim 19, wherein communications of the grant frame and data are performed in channel resources having a carrier frequency of 60 GHz.

23. The apparatus according to claim 19, wherein communications of the grant frame and data are performed utilizing a multiple-input multiple-output technique.

24. The apparatus according to claim 19, wherein:

the decoded grant frame includes, in sequence:
  a frame control header;
  a duration of the grant frame;
  a receiver address;
  a transmitter address;
  the dynamic allocation information field;
  a beam-forming control field; and
  a frame control sequence; and the decoded dynamic allocation information field further includes:
  an allocation duration that includes a duration of the data to be received.

* * * * *